(12) United States Patent
Jetté

(10) Patent No.: US 10,737,309 B2
(45) Date of Patent: Aug. 11, 2020

(54) APPARATUS AND METHOD FOR MANUFACTURING INSULATED PIPE ASSEMBLY

(71) Applicant: GF Urecon Ltd., Québec (CA)

(72) Inventor: Daniel Jetté, Ontario (CA)

(73) Assignee: GF Urecon Ltd., Québec (CA)

( * ) Notice: Subject to any disclaimer, the term of this patent is extended or adjusted under 35 U.S.C. 154(b) by 100 days.

(21) Appl. No.: 15/916,757

(22) Filed: Mar. 9, 2018

(65) Prior Publication Data
US 2019/0275580 A1    Sep. 12, 2019

(51) Int. Cl.
| | |
|---|---|
| *B21D 26/051* | (2011.01) |
| *B29C 48/09* | (2019.01) |
| *B21C 37/15* | (2006.01) |
| *B21D 39/06* | (2006.01) |
| *B29D 23/00* | (2006.01) |
| *F16L 59/14* | (2006.01) |
| *B29C 44/12* | (2006.01) |

(52) U.S. Cl.
CPC .......... *B21D 26/051* (2013.01); *B21C 37/153* (2013.01); *B21D 39/06* (2013.01); *B29C 44/1233* (2013.01); *B29C 44/1242* (2013.01); *B29C 48/09* (2019.02); *B29D 23/001* (2013.01); *F16L 59/143* (2013.01)

(58) Field of Classification Search
CPC ..... B21D 26/051; B21D 39/06; F16L 59/143; B29C 44/1233; B29C 44/1242; B29C 48/09; B21C 37/153; B29D 23/001
See application file for complete search history.

(56) References Cited

U.S. PATENT DOCUMENTS

| | | | |
|---|---|---|---|
| 4,084,842 A * | 4/1978 | Stonitsch | F16L 59/18 285/123.17 |
| 4,221,405 A * | 9/1980 | Stonitsch | F16L 59/18 285/53 |
| 5,424,015 A * | 6/1995 | Matsuda | B29C 31/002 264/130 |
| 8,950,071 B2 | 2/2015 | Knecht | |

* cited by examiner

*Primary Examiner* — Ryan J. Walters
(74) *Attorney, Agent, or Firm* — Harness, Dickey & Pierce, P.L.C.

(57) ABSTRACT

An apparatus and method for manufacturing a pipe assembly having an inner pipe and an outer jacket may include a support member, a pair of lance assemblies and a pair of caps. The support member supports the outer jacket of the pipe assembly and is drivable between a first position and a second position. The pair of lance assemblies are configured to be inserted into opposing ends of the inner pipe such that the pair of lance assemblies engage an inner wall of the inner pipe. One of the outer jacket and the inner pipes moves relative to the other of the outer jacket and the inner pipe to center the inner pipe within the outer jacket when the support member is driven from the first position to the second position. Insulation is inserted through at least one cap into a space between the inner pipe and outer jacket.

9 Claims, 6 Drawing Sheets

APPARATUS AND METHOD FOR MANUFACTURING INSULATED PIPE ASSEMBLY

FIELD

The present disclosure relates to an apparatus and a method for manufacturing an insulated pipe assembly.

BACKGROUND

This section provides background information related to the present disclosure which is not necessarily prior art.

Pipe holders such as disclosed in U.S. Pat. No. 8,950,071 allow for centering of a first pipe within a second pipe for the purpose of applying foam insulation between the first and second pipes. These pipe holders have various drawbacks such as strength limits when centering the first pipe within the second pipe, safety when operating, and providing results that are not repeatable. The teachings of the present disclosure provide an apparatus that is safe to operate and produces satisfactory results that are easily repeatedly.

SUMMARY

This section provides a general summary of the disclosure, and is not a comprehensive disclosure of its full scope or all of its features.

In one form, an apparatus for manufacturing a pipe assembly having an inner pipe and an outer jacket with insulation therebetween. The apparatus may include a support member, a pair of lance assemblies and a pair of caps. The support member supports the outer jacket and is drivable between a first position and a second position. The pair of lance assemblies are configured to be inserted into opposing ends of the inner pipe such that the pair of lance assemblies engage an inner wall of the inner pipe. The support member is driven from the first position to the second position such that one of the outer jacket and the inner pipe moves relative to the other of the outer jacket and the inner pipe to center the inner pipe within the outer jacket leaving a space therebetween. The pair of caps seal off opposing ends of the pipe assembly through which the foaming insulation is injected into the space between the inner pipe and outer jacket.

In some configurations, each lance assembly includes a lance body and an insert guide attached to an end of the lance body.

In some configurations, the lance body has a bulbous portion that engages the inner pipe of the insulated pipe assembly when the lance assembly is inserted into a respective end of the inner pipe.

In some configurations, the lance body is made of composite material with woven fibers.

In some configurations, the insert guides of the pair of lance assemblies define a first gap therebetween when the pair of lance assemblies are inserted a partial distance into the inner pipe, and wherein the insert guides of the pair of lance assemblies define a second gap therebetween when the pair of lance assemblies are inserted a remaining distance into the inner pipe.

In some configurations, the first gap is wider than the second gap.

In some configurations, each cap defines a recess that receives a respective end of the insulated pipe assembly when the cap seals off the respective end of the insulated pipe assembly.

In some configurations, each cap defines an opening that a respective lance assembly extends through when the respective lance assembly is inserted the partial distance into the inner pipe and the remaining distance into the inner pipe.

In some configurations, a first linear actuator configured to drive the support member between the first position and the second position.

In some configurations, another support member supports the outer jacket of the insulated pipe assembly.

In some configurations, a second linear actuator and a third linear actuator, and wherein the second linear actuator is configured to drive one lance assembly of the pair of lance assemblies, and the third linear actuator is configured to drive the other lance assembly of the pair of lance assemblies.

In another form, the present disclosure provides a method for manufacturing an insulated pipe assembly. The method includes inserting an inner pipe into an outer jacket such that an outer surface of the inner pipe rests on an inner surface of the outer jacket; inserting a pair of lance assemblies into opposing ends of the inner pipe such that the pair of lance assemblies engage the inner wall of the inner pipe; driving a support member from a first position to a second position to center the inner pipe within the outer jacket; capping opposing ends of the insulated pipe assembly with a pair of caps; and injecting foam through one of the caps into a cavity formed between the inner pipe and the outer jacket.

In some configurations, the method includes positioning the pair of lance assemblies so that each lance assembly is aligned with an opening of a respective end cap.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 3:
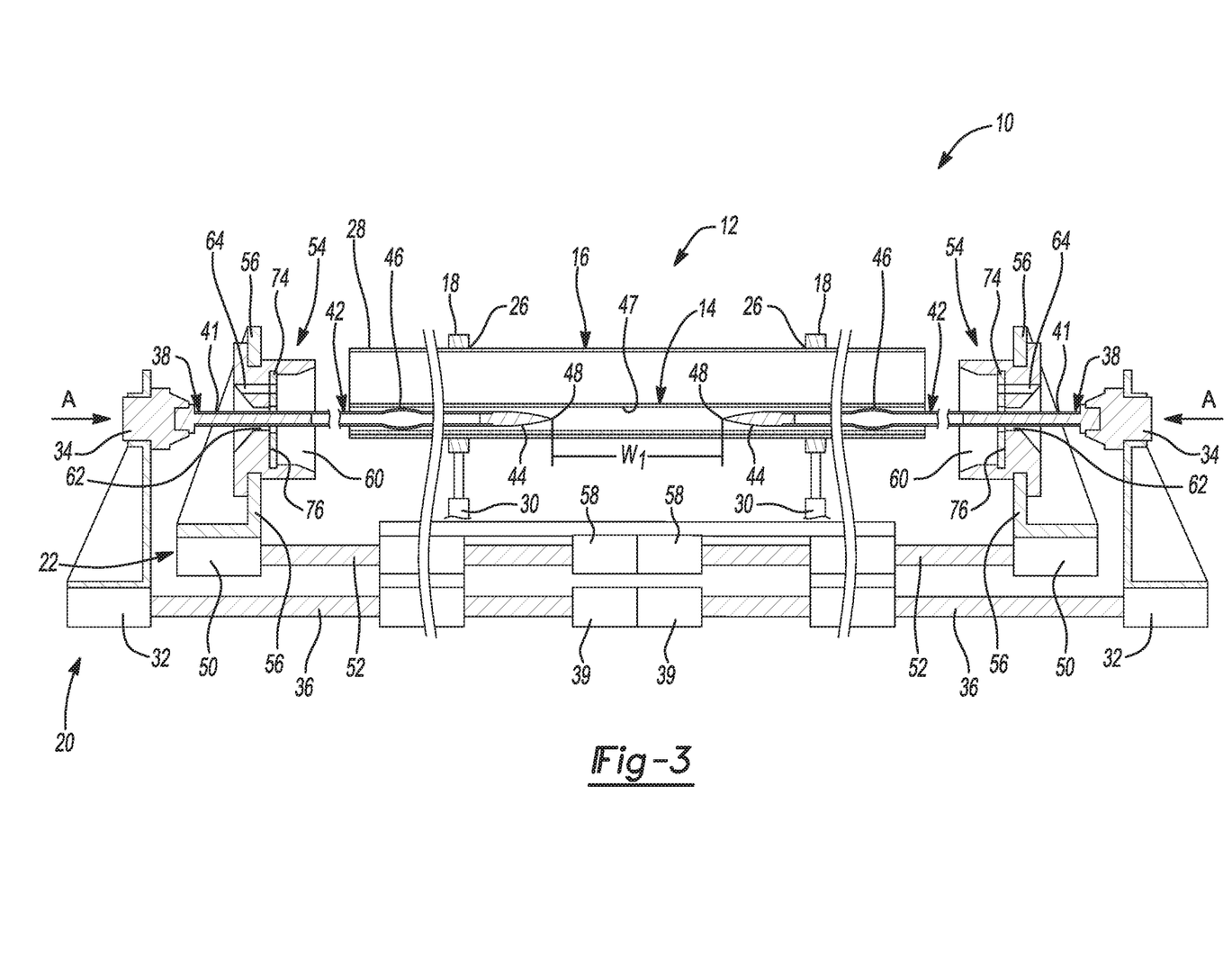
FIG. 3 is a cross-sectional view of a pair of lance assemblies of the apparatus inserted into the inner pipe a partial distance.
Figure 4:
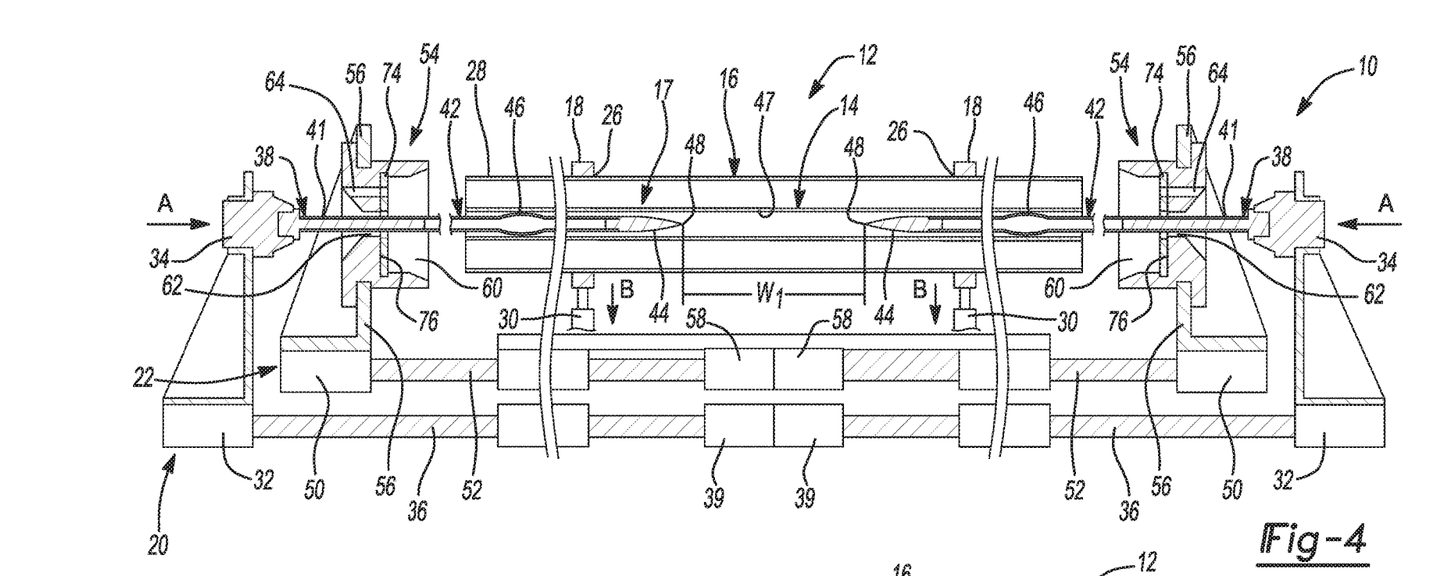
FIG. 4 is a cross-sectional view of support members of the apparatus centering the inner pipe within the outer jacket.
Figure 5:
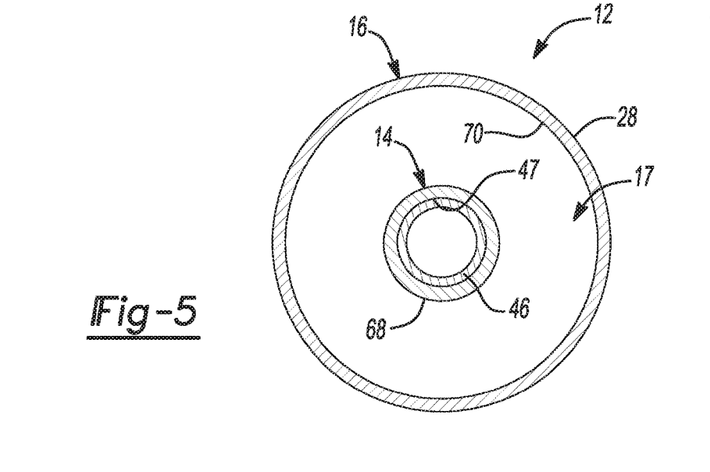
FIG. 5 is a cross-sectional view of the inner pipe centered within the outer jacket.
Figure 6:
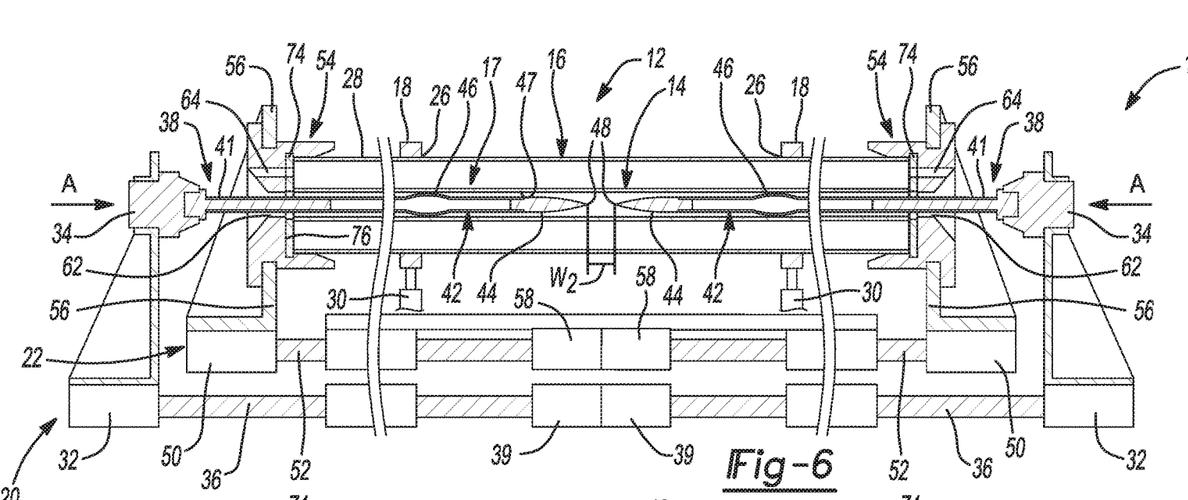
FIG. 6 is a cross-sectional view of the pair of lance assemblies inserted into the inner pipe a remaining distance and a pair of cap assemblies of the apparatus capping the pipe assembly.
Figure 7:
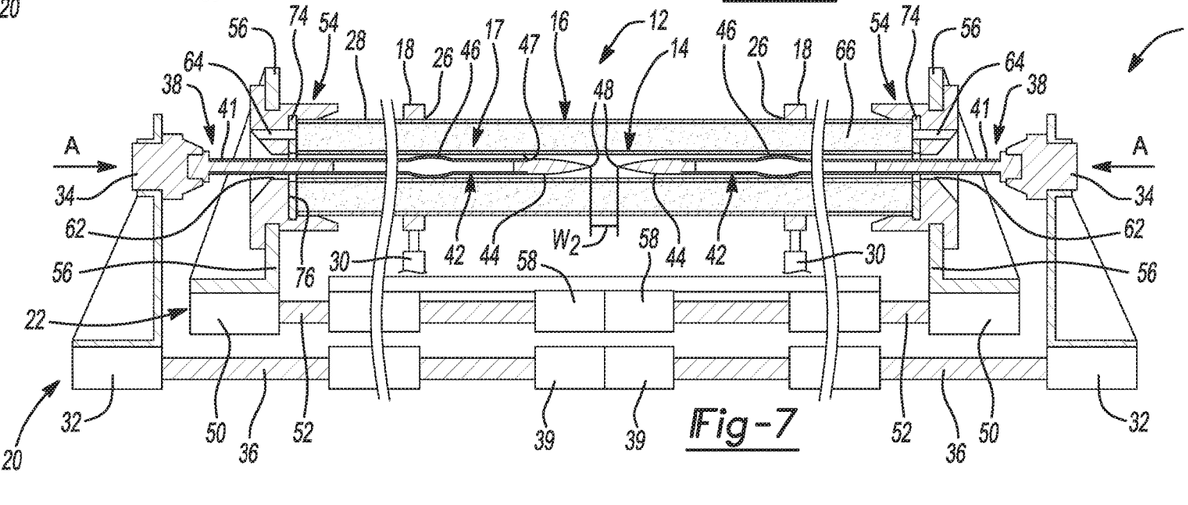
FIG. 7 is a cross-sectional view of the pipe assembly having foam injected between the inner pipe and the outer jacket.

With reference to FIGS. 1-9, an apparatus 10 is provided for manufacturing a pipe assembly 12 having an inner pipe 14 and an outer jacket 16 that forms a cavity 17 or space therebetween (FIGS. 4-6). As shown in FIGS. 1, 3, 4 and 6-8, the apparatus 10 includes a plurality of support members 18, a pair of guide mechanisms 20 and a pair of cap assemblies 22. Each support member 18 is made of a metallic material (e.g., steel, aluminum, etc.). Each support member 18 receives the outer jacket 16 of the pipe assembly 12 through an opening (not shown) such that an inner surface 26 of the support member 18 contacts an outer diametrical surface 28 of the outer jacket 16, thereby supporting the outer jacket 16 and restricting movement thereof in the radial direction. Each support member 18 is operatively connected to a linear actuator 30 such that the linear actuator 30 drives the support member 18 (in direction B) between a first position (FIGS. 1, 3 and 8) and a second position (FIGS. 4, 6 and 7).

support member 18 is made of a metallic material (e.g., steel, aluminum, etc.). Each support member 18 receives the outer jacket 16 of the pipe assembly 12 through an opening (not shown) such that an inner surface 26 of the support member 18 contacts an outer diametrical surface 28 of the outer jacket 16, thereby supporting the outer jacket 16 and restricting movement thereof in the radial direction. Each support member 18 is operatively connected to a linear actuator 30 such that the linear actuator 30 drives the support member 18 (in direction B) between a first position (FIGS. 1, 3 and 8) and a second position (FIGS. 4, 6 and 7).

Each guide mechanism 20 includes a bracket plate 32, a mounting base 34, a rod 36 and a lance assembly 38. The bracket plate 32, the mounting base 34 and the rod 36 are made of a metallic material (e.g., steel, aluminum, etc.). The mounting base 34 is attached to an upper end of the bracket plate 32 and the rod 36 is attached to a lower end of the bracket plate 32. Each rod 36 is operatively connected to a linear actuator 39 such that the linear actuator 39 drives the rod 36 (in direction A) a first distance (FIGS. 3 and 4) and a second distance (FIGS. 6 and 7). The lance assembly 38 is attached to the mounting base 34 so as to extend parallel to the rod 36. The lance assembly 38 is also configured to be inserted into an end of the inner pipe 14 of the pipe assembly 12 a partial distance (FIGS. 3 and 4) when the rod 36 is driven the first distance and a remaining distance (FIGS. 6 and 7) when the rod 36 is driven the second distance.

The lance assembly 38 includes a lance base 41, a lance body 42 and an insert guide 44. The lance base 41 is made of a metal alloy (e.g., hi-carbon steel) and is attached to the mounting base 34 at one end via adhesives, welding, or fasteners, for example. The lance body 42 is made of a carbon composite material and employs a carbon fiber weave that increases the elastic modulus, thereby increasing the strength and stiffness of the lance body 42. The lance body 42 is attached at one end to the lance base 41 via adhesives (e.g., epoxy) and attached at another end to the insert guide 44 via adhesives (e.g., epoxy). The lance body 42 includes a bulbous portion 46 that engages an inner diametrical wall 47 of the inner pipe 14 when the lance assembly 38 is inserted into the end of the inner pipe 14 the partial distance (FIGS. 3, 4) and the remaining distance (FIGS. 6 and 7). The insert guide 44 is made of a metal alloy (e.g., hi-carbon steel) and has a tapered end 48 to facilitate insertion of the lance assembly 38 into the end of the inner pipe 14. In some configurations, the insert guide 44 may be made of a non-metallic material (e.g., polymer, carbon composite, etc.).

Each cap assembly 22 is configured to cap a respective end of the pipe assembly 12, thereby enclosing the cavity 17 formed between the inner pipe 14 and the outer jacket 16 (FIG. 6) and restricting axial movement of the pipe assembly 12. Each cap assembly 22 includes a bracket plate 50, a rod 52 and a cap 54. The bracket plate 50, the rod 52 and the cap 54 are made of a metallic material (e.g., steel, aluminum, etc.). The bracket plate 50 includes arms 56 that engage and support the cap 54. The rod 52 is attached to a lower end of the bracket plate 50 and is operatively connected to a respective linear actuator 58 that drives the rod 52 between a first position (FIGS. 1, 3, 4 and 8) and a second position (FIGS. 6 and 7).

The cap 54 is configured to cap (or seal off) the end of the pipe assembly 12 when the rod 52 is driven from the first position (FIGS. 1, 3, 4 and 8) to the second position (FIGS. 6 and 7). The cap 54 defines a recess 60, an opening 62 and a passageway 64. The recess 60 receives a respective end of the pipe assembly 12 when the rod 52 is driven from the first position to the second position. The lance assembly 38 of a respective guide mechanism 20 extends through the opening 62 of the cap 54 when the rod 36 of the respective guide mechanism 20 is driven the first distance and the second distance. The passageway 64 extends from an end of the cap 54 to the recess 60 and allows insulation material 66 (e.g., foam) to be injected therethrough and into the cavity 17 formed between the inner pipe 14 and the outer jacket 16. The passageway 64 also allows for air within the cavity 17 to be vented during the expansion of the insulation material 66.

Figures 1, 2:
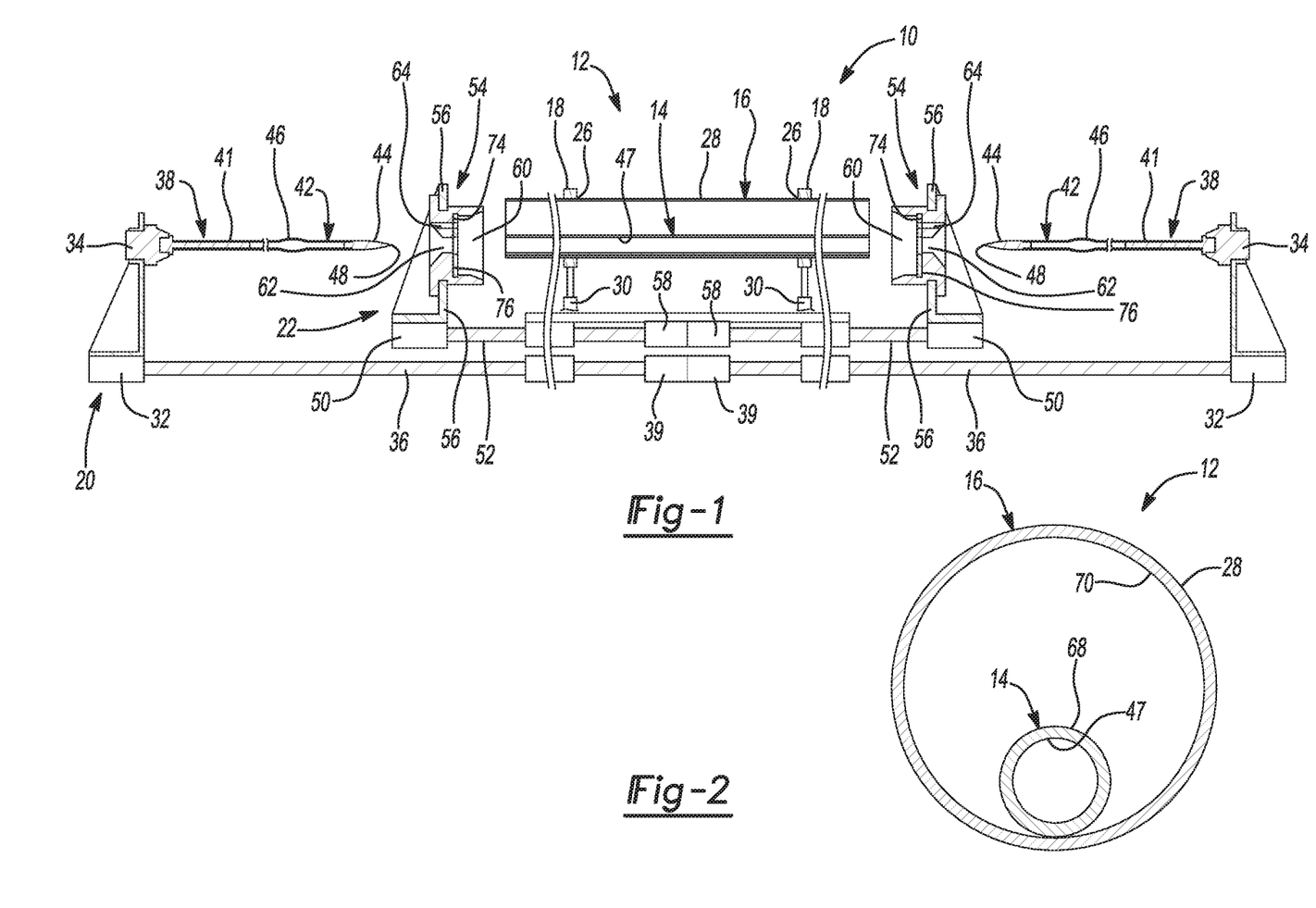
FIG. 1 is a cross-sectional view of an apparatus for manufacturing a pipe assembly according to the principles of the present disclosure.
FIG. 2 is a cross-sectional view of an inner pipe of the pipe assembly resting on a surface of an outer jacket of the pipe assembly.

With continued reference to FIGS. 1-9, operation of the apparatus 10 for manufacturing the pipe assembly 12 having insulation material 66 between the inner pipe 14 and the outer jacket 16 will be described in detail. Referring to FIG. 1, the apparatus 10 is in a set stage wherein the outer jacket 16 is received through the opening (not shown) of each support member 18 such that the inner surface 26 of each support member 18 contacts the outer diametrical surface 28 of the outer jacket 16, thereby supporting the outer jacket 16 and restricting movement thereof in the radial direction. As shown in FIGS. 1 and 2, the inner pipe 14 is inserted into the outer jacket 16 such that an outer diametrical surface 68 of the inner pipe 14 rests on an inner diametrical surface 70 of the outer jacket 16.

As shown in FIG. 3, the apparatus 10 is in an initial-work stage (i.e., each rod 36 of the pair of guide mechanisms 20 is driven the first distance (in direction A) via a respective linear actuator 39) such that each lance assembly 38 is inserted into a respective end of the inner pipe 14 a partial distance. It should be understood that the linear actuators 39 may operate independently of each other. Once each lance assembly 38 is inserted into the respective end of the inner pipe 14 the partial distance, the insert guides 44 of the pair of lance assemblies 38 define a first gap $W_1$ therebetween and the bulbous portion 46 of each lance assembly 38 engages the inner diametrical wall 47 of the inner pipe 14.

As shown in FIG. 4, the apparatus 10 is in an intermediate-work stage (i.e., each support member 18 is driven from the first position to the second position (in direction B) via a respective linear actuator 30) to lower the outer jacket 16 and center the inner pipe 14 within the outer jacket 16 (FIGS. 4 and 5), thereby forming the cavity or space 17 therebetween. It should be noted that the length of the pipes being assembled is quite long, often 16 feet or so. The construction of the lance assembly is so strong that it prevents the inner pipe 14 from sagging, especially towards the middle, thereby keeping the inner pipe 14 concentric with the outer jacket 16 throughout.

As shown in FIG. 6, the apparatus 10 is in the final work stage (i.e., each rod 36 of the pair of guide mechanisms 20 is driven the second distance (in direction A) via the respective linear actuator 39 and each rod 52 of the pair of cap assemblies 22 is moved from the first position to the second position via a respective linear actuator 58) such that each lance assembly 38 is inserted into the respective end of the inner pipe 14 a remaining distance and each cap 54 caps a respective end of the pipe assembly 12. Once each lance assembly 38 is inserted into the respective end of the inner pipe 14 the remaining distance, the insert guides 44 of the pair of lance assemblies 38 define a second gap $W_2$ therebetween and the bulbous portion 46 of each lance assembly remains engaged to the inner diametrical wall 47 of the inner pipe 14. The first gap $W_1$ is wider than the second gap $W_2$.

Figure 8:
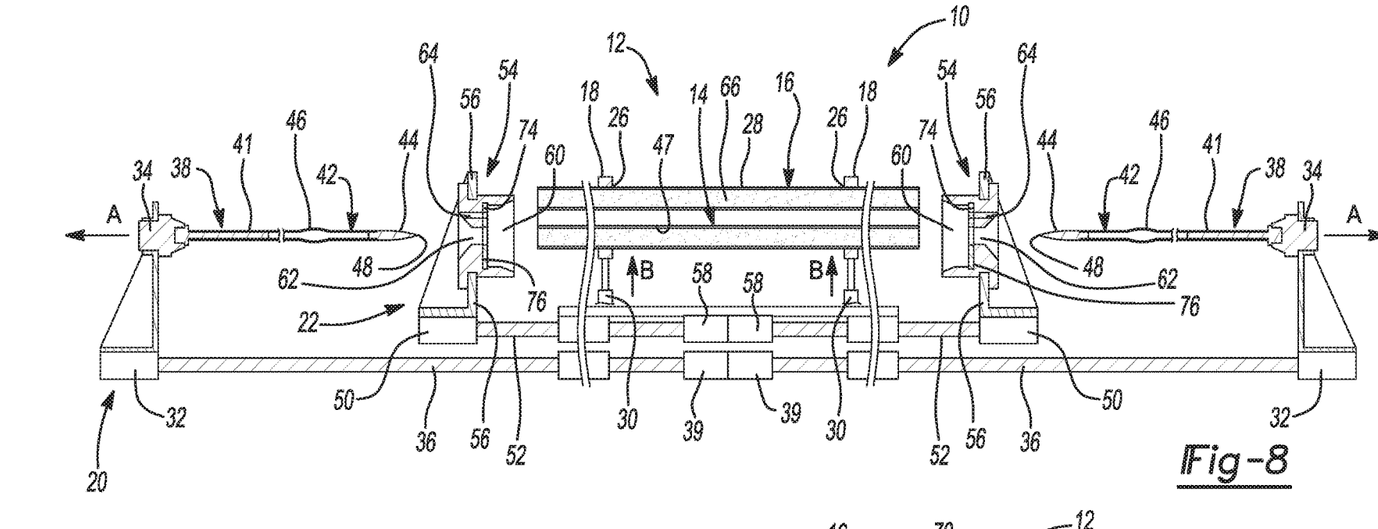
FIG. 8 is a cross-sectional view of the apparatus supporting the pipe assembly having foam therein.
Figure 9:
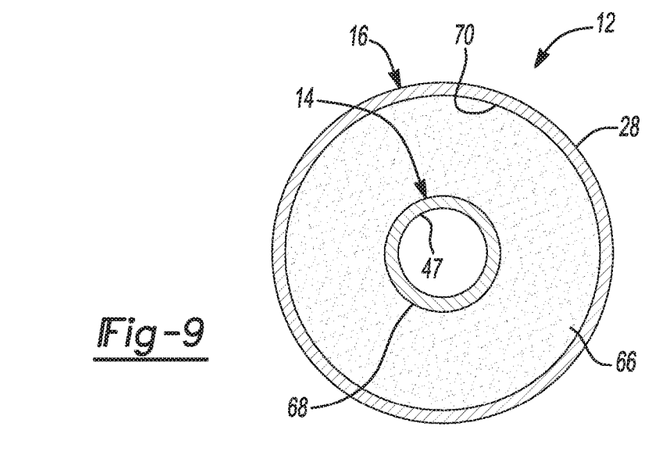
FIG. 9 is a cross-sectional view of the pipe assembly having foam injected between the inner pipe and the outer jacket.

As shown in FIG. 7, after the apparatus 10 has completed the final work stage, an insulation injecting device (not shown) injects the insulation material 66 (via high pressure injecting or pouring, for example) through the passageway 64 of one of the caps 54 into the cavity 17 formed between the inner pipe 14 and the outer jacket 16. As the insulation material 66 is injected, the pair of lance assemblies 38 are engaged with the inner pipe 14 to ensure that the inner pipe 14 maintains position (i.e., remains centered) within the outer jacket 16. A sealing member 74 is disposed in each recess 60 defined in each cap 54 between a surface 76 thereof and a respective end of the insulated pipe assembly 12 to prevent the insulation material 66 from escaping as it fills the cavity 17. The passageway 64 of the other cap 54 vents air within the cavity 17 as the insulation material 66 is injected therein. The force exerted on the insulated pipe assembly 12 by the pair of cap assemblies 22 provides the insulation material 66 with the requisite density once the cavity 17 is filled and the insulation material 66 hardens over a period of time. As shown in FIG. 8, the apparatus 10 returns to the set stage and the manufactured insulated pipe assembly 12 having the insulation material 66 between the inner pipe 14 and the outer jacket 16 can be removed therefrom.

Figure 10:
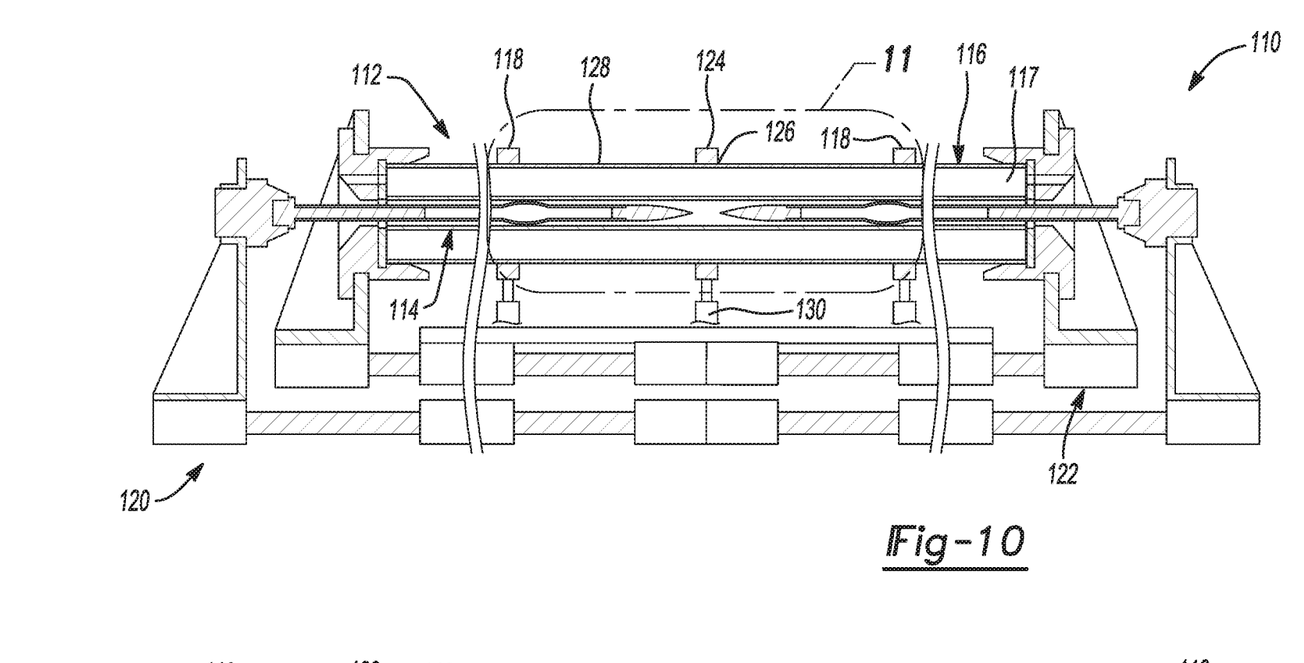
FIG. 10 is a cross-sectional of another apparatus for manufacturing a pipe assembly.
Figure 11:
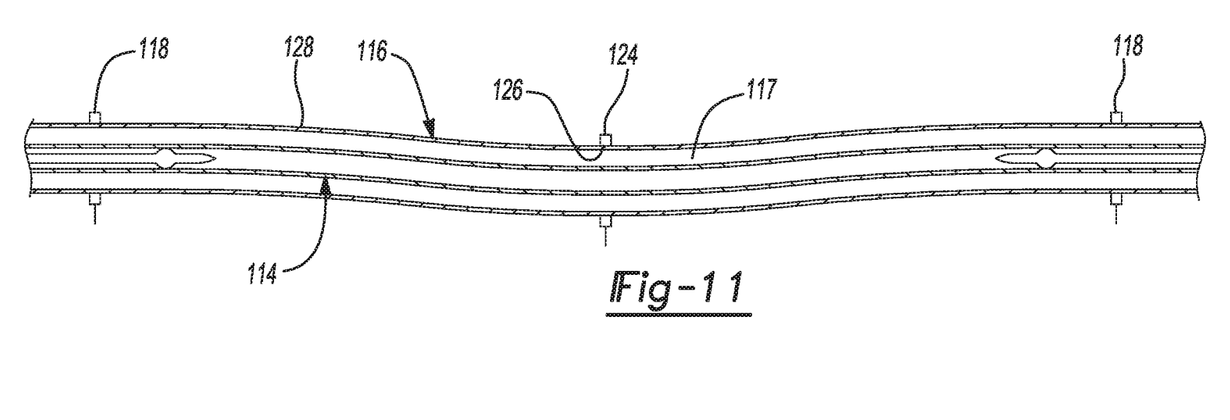
FIG. 11 is a close-up view of area 11 of FIG. 10 and includes a not-to-scale, exaggerated illustration of an inner pipe received within an outer jacket of a pipe assembly.

With reference to FIGS. 10 and 11, another apparatus 110 is provided for manufacturing a pipe assembly 112 having an inner pipe 114 and an outer jacket 116 that forms a cavity or space 117 therebetween. The apparatus 110 may be generally similar to the apparatus 10 described above, apart from any differences described below. The apparatus 110 may include a plurality of support members 118, a pair of guide mechanisms 120 and a pair of cap assemblies 122. The structure and function of the support members 118, the pair of guide mechanisms 120 and the pair of cap assemblies 122 may be similar or identical to that of support members 18, the pair of guide mechanisms 20 and the pair of cap assemblies 22, respectively, described above, and therefore, will not be described again in detail.

The apparatus 110 may also include a support member 124 disposed between the support members 118 at a middle portion of the outer jacket 116. The support member 124 is made of a metallic material (e.g., steel, aluminum, etc.) and receives the outer jacket 116 of the pipe assembly 112 through an opening (not shown) such that an inner surface 126 of the support member 124 contacts an outer diametrical surface 128 of the outer jacket 116, thereby supporting the outer jacket 116. The support member 124 is operatively connected to a linear actuator 130 such that the linear actuator 130 may provide a force to the outer jacket 116 to produce mechanically induced sag at the middle portion thereof that equals the sag of the inner pipe 114. That is, the inner pipe 114 may sag at the middle portion thereof because of gravity or other natural forces (e.g., weight) acting on the inner pipe 114. The mechanically induced sag of the outer jacket 116 keeps the inner pipe 114 centered within the outer jacket 116 throughout the length of the pipe assembly 112. In this way, the inner pipe 114 is centered within the outer jacket 116 throughout the length of the pipe assembly 112 when the insulation material (not shown) is injected into the cavity 117 formed between the inner pipe 114 and the outer jacket 116.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of manufacturing an insulated pipe assembly, the method comprising:
    inserting an inner pipe into an outer jacket such that the inner pipe rests on an inside surface of the outer jacket;
    inserting a pair of lance assemblies into opposing ends of the inner pipe such that the pair of lance assemblies engage an inside wall of the inner pipe;
    driving a support member from a first position to a second position to center the inner pipe within the outer jacket;
    capping opposing ends of the insulated pipe assembly with a pair of caps; and
    injecting insulation through one of the caps into a cavity formed between the inner pipe and the outer jacket.

2. The method of claim 1, further comprising positioning the pair of lance assemblies so that each lance assembly is aligned with an opening of a respective cap.

3. The method of claim 2, further comprising inserting the pair of lance assemblies into opposing ends of the inner pipe a partial distance such that a first gap is defined therebetween and a remaining distance such that a second gap is formed therebetween.

4. The method of claim 3, wherein the first gap is wider than the second gap.

5. The method of claim 4, wherein each lance assembly includes a lance body having a bulbous portion that engages the inside wall of the inner pipe.

6. The method of claim 5, wherein the lance body is made of a composite material with woven fibers.

7. The method of claim 6, wherein each cap defines a recess that receives a respective end of the insulated pipe assembly once the cap caps the respective end of the insulated pipe assembly.

8. The method of claim 7, further comprising driving one lance assembly of the pair of lance assemblies using a first linear actuator and driving the other lance assembly of the pair of lance assemblies using a second linear actuator.

9. The method of claim 8, further comprising driving the support member using a third linear actuator.

* * * * *